Dec. 10, 1929.  P. M. SALERNI  1,738,927
VALVE FOR PNEUMATIC TIRES
Filed Dec. 22, 1926  3 Sheets-Sheet 1
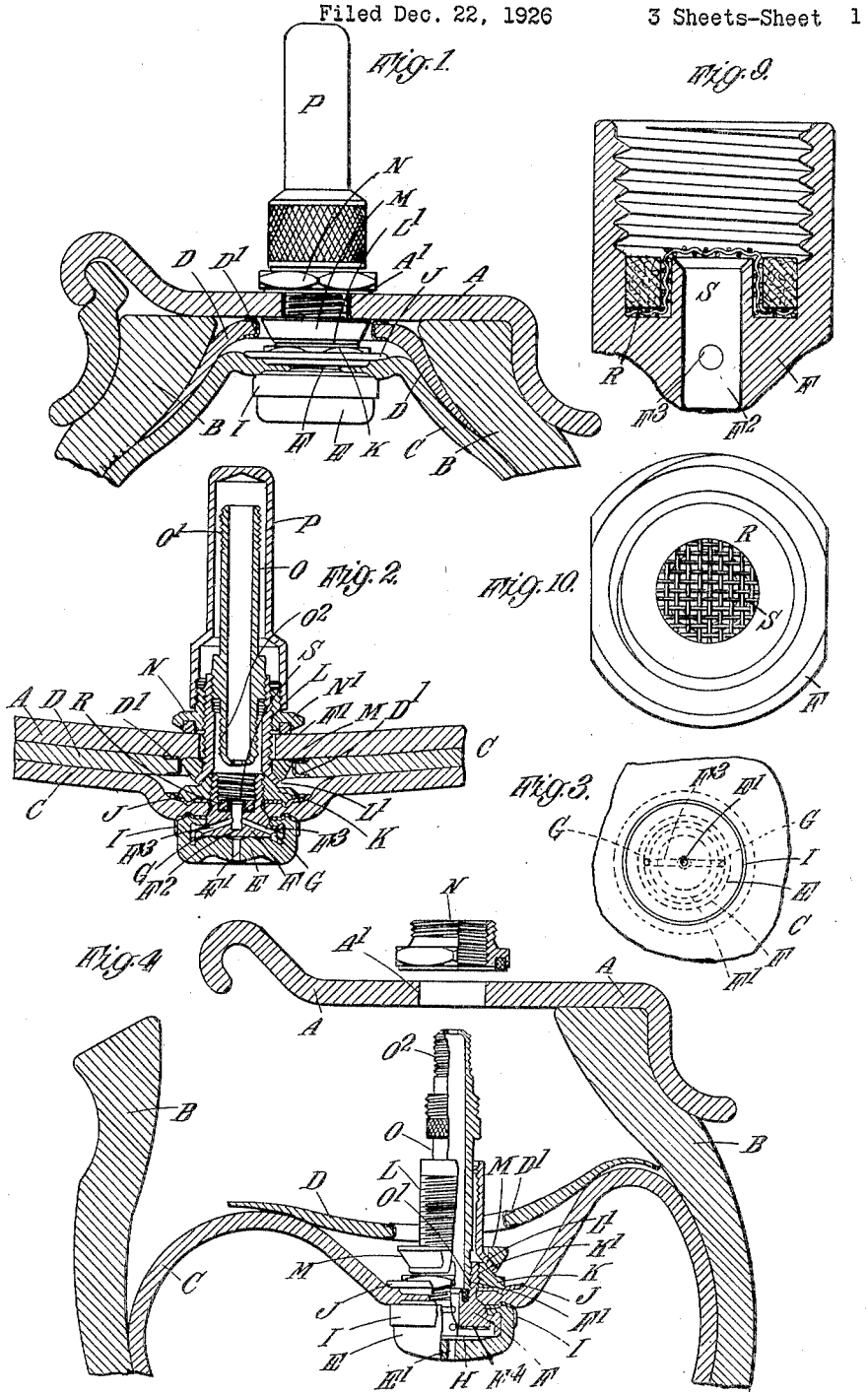

Dec. 10, 1929.  P. M. SALERNI  1,738,927
VALVE FOR PNEUMATIC TIRES
Filed Dec. 22, 1926   3 Sheets-Sheet 2
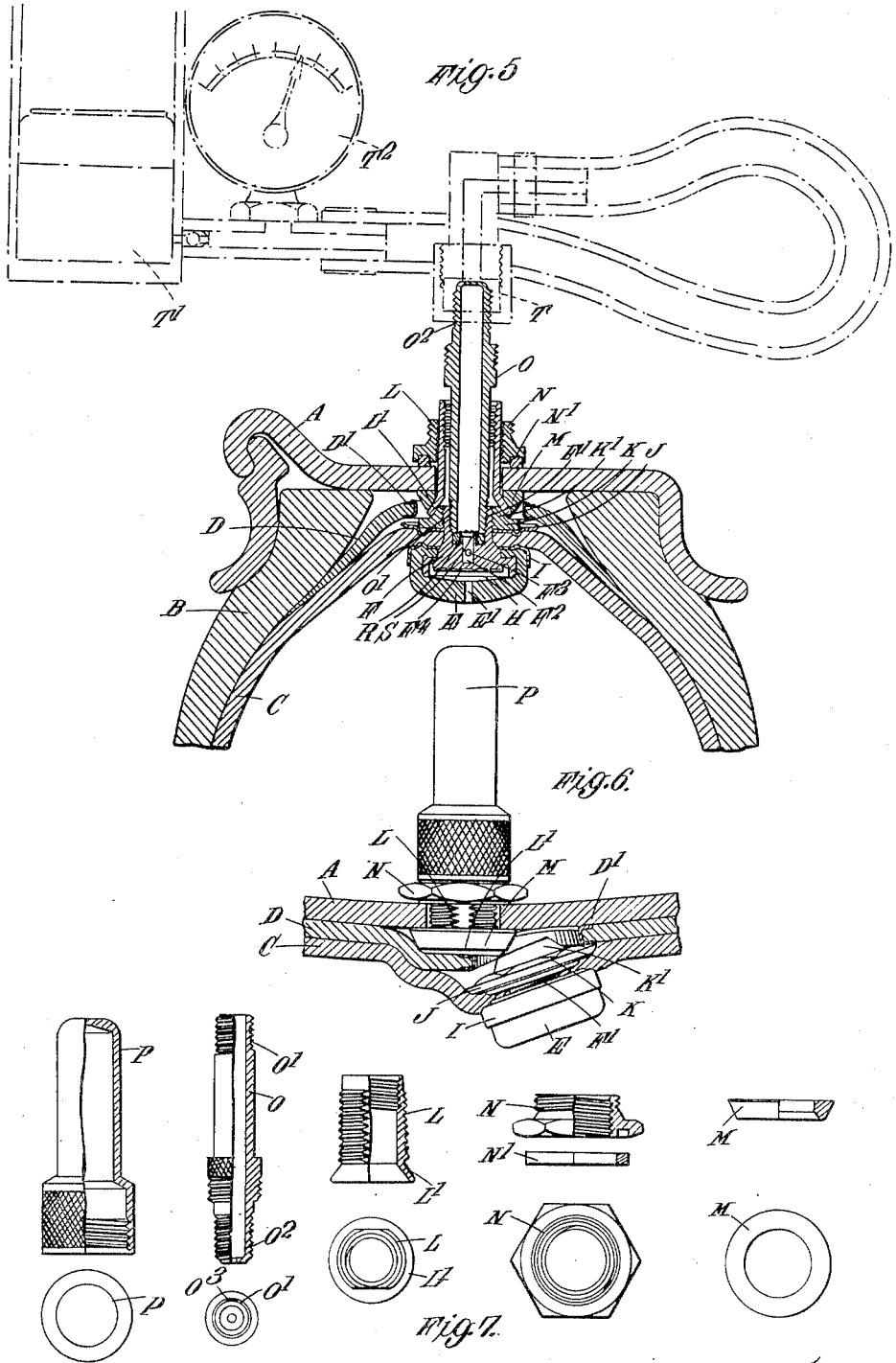

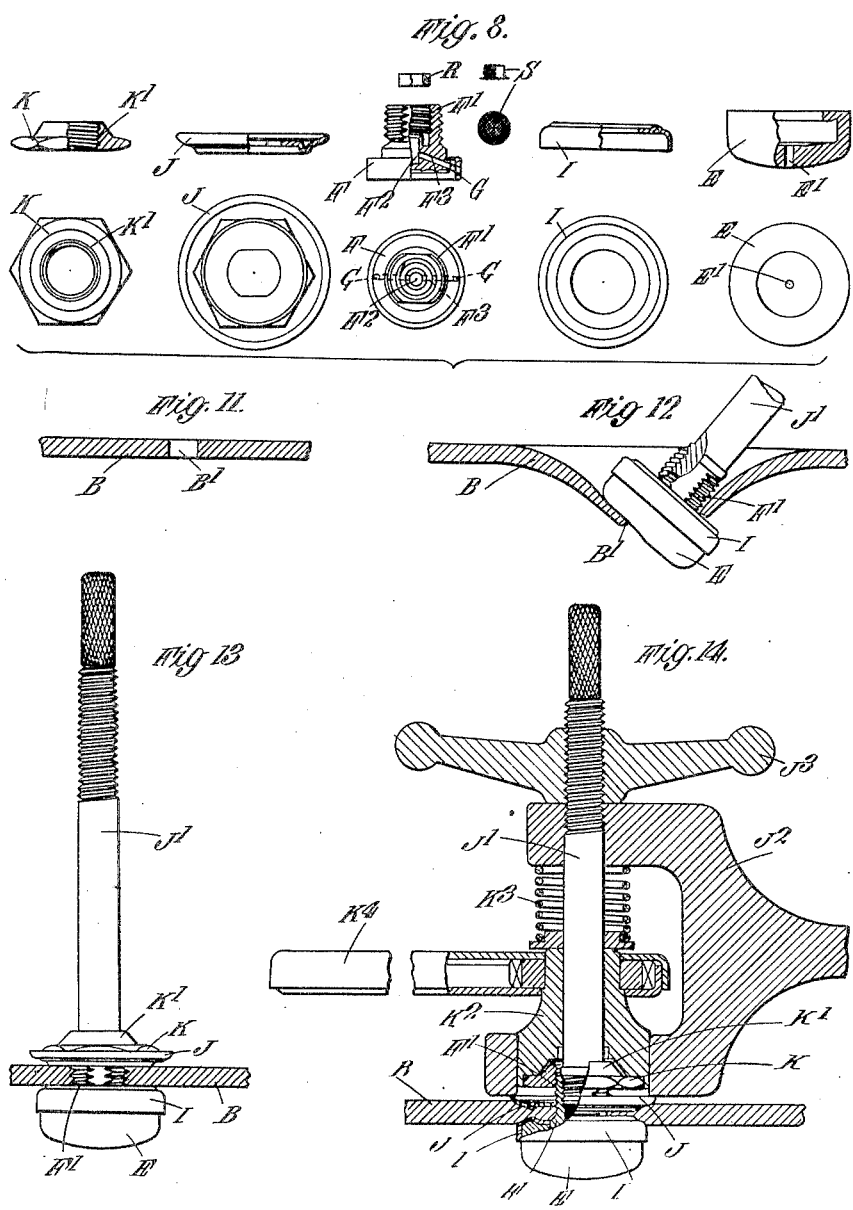

Patented Dec. 10, 1929

1,738,927

UNITED STATES PATENT OFFICE

PIERO MARIANO SALERNI, OF ROUTE DE VILLEFRANCE, NICE, FRANCE, ASSIGNOR TO MARIE-THÉRÈSE ELISABETH SALERNI, OF NICE, FRANCE

VALVE FOR PNEUMATIC TIRES

Application filed December 22, 1926, Serial No. 156,312, and in Great Britain December 2, 1926.

This invention relates to pneumatic tires and has more particular reference to valves for such tires and to the mounting or arrangement of such valves in the tires. A pneumatic tire valve according to present day practice is securely fixed to the inner tube and projects through a hole in the wheel rim to which the projecting part is clamped by a securing nut so that the valve secured to the inner tube is immovably held to the rim. If there be a tendency for the inner tube to which the valve is affixed, to creep circumferentially or to move relatively to the rim there would be a likelihood of the connection of the valve to the inner tube being detrimentally affected with the result that the inner tube may be torn away from the fixed valve, thus causing a burst in the tire which may have serious consequences.

The chief object of the present invention is to so arrange the valve and the parts associated therewith that bursting of the tire due to creeping of the inner tube or to the tendency of the inner tube to creep or move relatively to the rim is prevented. A further object of the present invention is to provide an improved construction of tire valve which maintains an efficient airtight closure of the inner tube not only under ordinary conditions but under conditions when creeping or relative movement of the inner tube takes place so that there is little likelihood of leakage at the valve under any conditions, which in itself is a safe-guard as creeping is in most cases the result of under inflation due to a leak at the valve.

According to this invention the tire valve or sealing device (or the essential parts thereof) is located at a position on the outer side or periphery of the wheel rim i. e. at a position on or radially beyond the outer peripheral surface of the rim and whilst normally housed in or associated with the latter no positive connection is provided between the rim and the valve so that the latter is not held against movement but is free to move with the inner tube if there should be any tendency for creeping of the inner tube or for relative movement between the tube and the wheel rim. The said valve may be fixed to the inner tube so as to be disposed inside the latter and it is adapted to register or engage with a seating or opening in the wheel rim through which latter an inflating connection or the like can be introduced so as to be connected to the valve for enabling the inner tube to be inflated. After the inflating connection has been removed the valve will remain in the position aforesaid so long as there is no creeping or relative movement of the inner tube sufficient to displace the valve. The seating in the wheel rim may be constituted by a tubular member which is secured in a hole in the wheel rim and which may be closed after inflation by means of a dust cap or the like. An adaptor may be fitted in the said tubular member and for inflating purposes it can be screwed into the valve attached to the inner tube and can afterwards be disconnected and still held within the tubular member so as to be covered by the dust cap, thus leaving the valve free although located in the seating constituted by the aforesaid tubular member. The engagement of the valve with its seating is such that if the inner tube should creep or move relatively to the rim and exert a pull on the valve the latter can thereby be readily moved out of engagement with the said seating so that there is no likelihood of the inner tube adjacent to the valve being stretched to any extent which would be likely to produce leakage around the valve. In tires where a band or strip of fabric is placed between the inner tube and the rim, the said band or strip may be provided with a hole having a metal or other rigid edging which is disposed around the said valve seating on the rim. The said seating may have a bevelled surface which in the event of the fabric band or strip moving relatively to the rim and the seating, enables the said metal edging to "ride" or slip over the seating so that the band is quite free to move with the inner tube when the latter creeps or moves relatively to the rim. The valve itself which is attached to the inner tube may comprise a flexible, deformable or movable member which may be in the form of a rubber diaphragm-like part that is adapted to engage with a seating or disc having passages or holes through which the air is supplied when the pump connection is fitted and which do not register with a hole or holes in the said rubber diaphragm through which hole or holes the air passes from the said passages into the inner tube. When the pump connection is removed however the preponderating internal pressure within the tire causes the said diaphragm-like part to be pressed against its seating or disc which is provided with ridges that become embedded in the rubber and form an efficient closure between the holes in the seating or disc and the hole or holes in the diaphragm-like portion, thus preventing the escape of air from the tire and maintaining the inflation pressure under all conditions.

In order that the said invention may be clearly understod and readily carried into effect, the same will now be more fully described with reference to the accompanying drawings, in which:—

Figure 1 is a transverse sectional view of a wheel rim with the bead portions of a straight sided tire and part of the inner tube in position, showing one construction of the improved tire valve in elevation.

Figure 2 is a sectional view of the improved valve taken at right angles to the view shown in Figure 1.

Figure 3 is a plan view of the improved valve.

Figure 4 is a view showing how the tire cover and the inner tube with the improved valve are fitted on the wheel rim.

Figure 5 is a view showing an inflating pump (illustrated by dotted lines) connected to the valve.

Figure 6 is a circumferential sectional view showing a position the valve may assume due to creeping or movement of the inner tube relatively to the rim.

Figure 7 illustrates the separate parts associated with the valve that are fitted to the rim.

Figure 8 illustrates the separate parts of or associated with the valve that are attached to and carried by the inner tube.

Figures 9 and 10 are enlarged detail views.

Figures 11, 12, 13 and 14 are views showing one way of attaching the valve to the inner tube, and a device or tool for use in connection therewith.

In the said drawings A represents the wheel rim which may be of any usual or suitable construction. B indicates the pneumatic tire cover. C represents the inner tube. D indicates a fabric band or strip which is generally used in conjunction with a rim and tire of the type illustrated and which is placed around the rim so as to lie between the inner tube and the beads of the outer cover as illustrated. E generally indicates the valve which as shown in Figure 1 is disposed within the inner tube so as to be located entirely beyond the outer peripheral surface of the flat part of the wheel rim A. In particular E refers to a cap or cover of soft and pliable india rubber which constitutes a diaphragm-like portion having a hole E' therein centrally disposed with regard to a seating or disc F (see Figures 2, 4 and 8) of metal, hard rubber or other hard or rigid material which is entirely covered by the said rubber cap or cover E as shown in Figures 2 and 4. The said disk F is provided with an externally and internally threaded stem F' and it is formed with a central passage or bore $F^2$ and with inclined lateral or branch passages $F^3$ that terminate in holes G near the periphery of the disc F and establish communication with a space or chamber H between the rubber cap or diaphragm E and the surface of the disc F which surface is provided with raised annular projections or ridges $F^4$ as shown. The said rubber cap or diaphragm E normally does not make contact with the ridged surface of the disc as shown in Figures 4 and 5 but it can do so under the influence of the air pressure within the inner tube as hereinafter described. The said chamber or space H is in communication with the interior of the inner tube B through the hole E' in the said rubber cap or diaphragm, which hole is the air inlet into the inner tube and is adapted to be closed by the rubber cap or diaphragm E being pressed by the internal air pressure within the inner tube onto the ridged surface of the disc, so that the ridges $F^4$ become embedded in the rubber and produce an efficient airtight closure. The stem F' of the disc extends through a hole B' in the inner tube B, and the latter is clamped beween metal plates or washers I and J by a nut K screwed on the stem F', the plate or washer I being flanged and adapted to fit around the turned over edge of the rubber cap or diaphragm E as shown. For securing the valve to the inner tube a rod J' is screwed into the stem F', see Figures 12 and 13, and the valve is pushed through the hole B' into the interior of the tube B; the hole B' is smaller in diameter than the stem F' so that the rubber around the hole tightly grips the stem F'. The washer J and the nut K are placed on the rod J' which is then slidably fitted in a tool $J^2$ (see Figure 4) adapted to bear on the washer J as shown. By means of a nut $J^3$ or the like screwed on to the rod J' as shown, the rod and the tool can be moved in opposite directions with the result that the washers I and J are moved towards each other to grip or compress the portion of the inner tube B between them. A rotating device or spanner $K^2$ forming part of the said tool and surrounding the stem J' is pressed into engagement with the nut K by a spring $K^3$ and it can be rotated by a ratchet controlled handle $K^4$ so to screw the nut K into a locking recess in the washer J which recess is of hexagonal or other shape conforming to that of the nut. When the spanner is moved out of engagement with the nut K and the tool is removed from engagement with the washer J, the rubber compressed between the washers I and J causes the washer J having the locking recess in which the nut is located to hold the nut against rotation, so that the valve is securely held on to the inner tube.

The nut K is formed with a coned boss or projection K' which is adapted to bear against or to fit within a coned or similarly shaped seating or end L' of a tubular member L secured to the rim. The coned seating or end L' of the said member L is caused to bear against a collar or ring M formed with a bevelled outer surface by means of a nut N having an inserted washer N' screwed on to the said member L and adapted to bear against the inner surface of the rim. In the aforesaid fabric strip or band D disposed around the rim, is a hole which is provided with a metal edging or ring D' that surrounds the aforesaid collar M so that in the event of any relative movement taking place between the fabric strip or band and the collar M the metal edging D' in engaging with the bevelled surface of the collar M will pass over and beyond the end of the tubular member L as hereinafter more fully described. A tubular stem or adaptor O is adapted to be screwed into the tubular member L as shown in Figure 2, and its outwardly projecting end O' which is exteriorly screw threaded can be covered by a dust cap or sleeve P that can be screwed on to a threaded extension or boss of the nut N. The said adaptor can be readily unscrewed and withdrawn from the tubular member L after the dust cap has been removed and it can be reversed so as to be inserted easily within the said tubular member to permit of it being screwed into the threaded stem F' on the disc F as shown in Figures 4 and 5 the end O' of the adaptor being forced against a leather or similar packing ring R in the said stem to produce an airtight seal or closure. The leather or similar packing ring R surrounds and retains in position a gauze cover or cap S disposed across the passage F' in the stem F to serve as a filter for air that is introduced into the inner tube through the passages $F^2$ and $F^3$ and the hole E' in the rubber cap or diaphragm E. When the adaptor O is in the position shown in Figure 5 an inflating connection T can be screwed to its end $O^2$ so that the inner tube can be inflated by a pump T' having a pressure gauge $T^2$.

In order to mount the tire on the rim, the inner tube slightly inflated with the valve attached as shown in Figure 4 is first placed on the rim with the valve located in the hole in the fabric band or strip D. The tubular member or rim tube L and the collar M are placed centrally on the valve and the adaptor O is then passed through the tubular member and screwed into the stem F' of the disc F so as to bear against the leather washer or seating R as indicated in Figure 4. The adaptor O with the tubular member L and the collar M thereon is then passed through the hole A' in the wheel rim and by applying the nut N to the tubular member L on the inner side of the rim the inner tube is held in position to enable the fabric strip to be placed neatly in position so as to be covered by the beads and side walls of the outer cover which is fitted and secured in the ordinary way.

Having so mounted the tire, the inner tube can be inflated by applying the pump connection T to the projecting end $O^2$ of the adaptor O, and by operating the pump T' the air is forced through the adaptor O so as to pass into the passage $F^2$ in the disc F whence it passes through the passages $F^3$ and the holes G into the space H from which it enters the inner tube through the inlet hole E' in the rubber cap or diaphragm E. Having inflated the inner tube to the desired pressure which is indicated by the gauge $T^2$, the connection T is removed with the result that the internal air pressure which exceeds the exterior air pressure causes the rubber cap or diaphragm E to be pressed against its seating constituted by the aforesaid disc F so that the rubber fits closely against the ridged surface with the ridges embedded in the rubber to cut off positively all communication between the hole E' and the space H which is normally in communication with the holes G leading from the passages $F^3$ extending from the central inlet $F^2$. In this way the valve is efficiently closed and the inflation pressure within the inner tube maintained. The adaptor O is then removed and reversed to the position shown in Figure 2 whereupon the dust cap or sleeve P is applied and screwed onto the nut N as shown.

In order to test the pressure in the tire the dust cap P is removed and the adaptor O is also reversed so that its end O' bears against the leather ring R. The pump then is connected to the adaptor and by imparting one or two strokes to the pump the valve is opened by reason of the rubber cap or diaphragm E being forced away from its ridged seating F thus establishing communication between the interior of the inner tube and the pressure gauge which will indicate the inflation pressure. If the pressure is insufficient the pump can be operated until the reading on the gauge indicates the required pressure. If it be desired to reduce the pressure or to deflate the tire completely the adaptor O with the connection T applied is slightly unscrewed to move the end O' thereof away from the leather ring R and by means of a flat surface $O^3$ (see Figure 7) on the screw thread at the end O' a restricted passage for escape of air from the inner tube is provided. The escaping air reduces the pressure to the desired degree whereupon the pump connection is removed to enable the preponderating internal pressure to close the valve as aforesaid. If the connection T is not removed the tire can be completely deflated by the escape of air through the passage $O^3$.

It will be understood from the foregoing description that no part of the valve affixed to the inner tube nor the tube itself is positively secured to any part of or on the rim so that the valve and its associated parts constitutes a unit which is separate from the tubular member L and its associated parts carried by the rim. If there should be any tendency for the inner tube to creep or to move relatively to the rim, the valve secured as it is to the inner tube can move away from or out of contact with the coned end or seating L' of the tubular member L, the coned surfaces on the seating L' and on the projection K' of the nut K facilitating the separation of the two parts. As the fabric band or strip D would tend to move with the inner tube in the event of creeping taking place, it is free to partake of this movement and the metal edging D' engaging with the bevelled surface of the collar M causes the strip to pass over the end of the tubular member L so as to enable the fabric band or strip to move with the inner tube. Figure 5 illustrates a position such as may be assumed as a result of creeping of the inner tube and the fabric band or strip D in relation to the rim and it will be understood that the said valve and the band or strip D may take up any position on the rim as a result of creeping as there is no connection of any kind to prevent movement of the inner tube or the fabric band or strip. By arranging for the valve to move relatively to the rim as hereinbefore described there is no likelihood of the inner tube being torn adjacent to the valve and causing a burst tire as a result of creeping or relative movement. As indicated in Figure 1 the valve does not project radially beyond the edges of the rim flanges so that the latter serve to protect the valve if for any reason the wheel should be supported on the ground with its tire deflated.

The invention is applicable to pneumatic tires for various types and kinds of vehicles. In most instances creeping of the inner tube is due to under inflation which is often caused by a leakage in or adjacent to the valve. If as a result of such creeping of the inner tube the valve is moved away from the tubular member or seating L the tube can be deflated to enable the tire to be removed by inserting a sharp instrument through the tubular member L in order to puncture the tube and cause complete deflation. Such a puncture can be readily repaired and this method of deflation is advantageous as it ensures of attention being given to the tube in order to discover the cause of under inflation which was responsible for the creeping of the inner tube. Therefore re-inflation of a leaky inner tube is unlikely as the tire must be opened by puncturing as aforesaid before the tube can be re-inflated so that this will induce even a very careless user to attend to the cause of the leak which produced the under inflation responsible for the creeping. Further the repair of a puncture as aforesaid would be a negligible consideration having regard to the prevention of a dangerous and inevitable burst which would ordinarily happen in the cause of an inner tube with a valve positively secured to the wheel rim. In the case of aeroplane tires creeping movement of the inner tube might be due to the shock of landing and in the event of such creeping having taken place it would be necessary to puncture the tire as aforesaid for the purpose of re-inflating.

What I claim and desire to secure by Letters Patent of the United States is:—

1. In a pneumatic tire, an inflation valve on the inner tube adapted to be located adjacent to an opening in the rim and an adaptor that can be inserted through the said opening in the rim and can be disconnected from the valve after inflation and carried in the said opening.

2. In a pneumatic tire, an inflation valve on the inner tube adapted to be located adjacent to an opening in the rim, a tubular member in said opening and an adaptor that can be secured to the valve through the tubular member in the rim for inflating purposes and can be reversed after inflation so as to be secured in the said tubular member without being connected to the valve.

PIERO MARIANO SALERNI.